July 22, 1952

C. W. BROWN 2,604,392

APPARATUS FOR DETERMINATION OF ANILINE POINT

Filed June 2, 1947

INVENTOR
CLAYTON W. BROWN
BY
James G. Cleveland
ATTORNEY

July 22, 1952 C. W. BROWN 2,604,392
APPARATUS FOR DETERMINATION OF ANILINE POINT
Filed June 2, 1947 2 SHEETS—SHEET 2
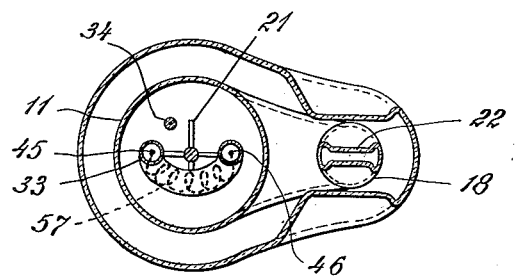
Fig. 2.
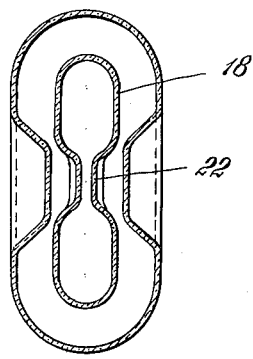
Fig. 3.
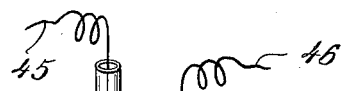
Fig. 4.
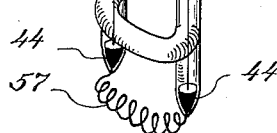
INVENTOR
CLAYTON W. BROWN
BY James Y. Cleveland
ATTORNEY Patented July 22, 1952

2,604,392

UNITED STATES PATENT OFFICE 2,604,392

APPARATUS FOR DETERMINATION OF ANILINE POINT

Clayton W. Brown, Woodbury, N. J., assignor to Socony-Vacuum Oil Company, Incorporated, a corporation of New York Application June 2, 1947, Serial No. 751,775

4 Claims. (Cl. 73—53)

This invention relates generally to the analysis of petroleum products and lubricants and more particularly to apparatus for the automatic determination of the aniline point of petroleum products and lubricants.

The A. S. T. M. in September 1945, defined aniline point as ". . . the minimum equilibrium temperature for equal volumes of aniline and petroleum product."

Many proposals have been made for adapting this test to dark colored products. Among these proposals were the determination of the temperature at which a break occurred in the viscosity-temperature curve; the detection of a change in transparency to infrared radiation by the use of a thermopile or a photocell and microammeter; visual observation through a 2.0 millimeter layer by using a "circulating test tube"; and visual determination of the temperature by observing a film of the sample. All of these proposals are subject to criticism on one or more grounds.

Additionally in order to overcome the hazard involved in determining high aniline points of highly paraffinic lubricating oils the proposal has been made to substitute n-methylaniline for aniline. Data, however, indicate that n-methylaniline points are approximately 77° C. lower than aniline points.

The A. S. T. M. has, by means of a tedious and laborsome process, determined the aniline cloud point for petroleum products and lubricants and standardized their findings. Therefore in order for any laboratory determinations of aniline point to be acceptable the results must compare with the standards established by the A. S. T. M. The A. S. T. M. has held that results that are within 0.2° C. are acceptable.

The method and apparatus used by the A. S. T. M. comprises placing the sample which is to undergo test in a spaced jacket receptacle formed by inserting a small test tube inside of one having a larger diameter. The two test tubes are held in spaced concentric relationship by a cork spacer-stopper. Then the sample is enclosed in the inner tube of the receptacle by a cork stopper through which has been inserted a stirrer and thermometer. Heat or coolant, depending upon the aniline point of the sample relative to room temperature, is applied to the exterior of the receptacle while the sample is being stirred until the sample becomes miscible or immiscible, respectively. The temperature at which any sample becomes miscible or immiscible is critical and the change occurs instantaneously. Through means of visual observation the A. S. T. M. workers are able to observe this change and stop heating or cooling the external jacket of the sample container. Although this step is taken just as soon as the change is noted the instantaneous temperature of the external jacket continues to exert an influence on the sample which may be compared to the inertia of a moving mass after the motivating force has been removed. Therefore a quick reading of the thermometer while the level of the column therein is still changing is necessary. A further requirement of the A. S. T. M. method is that after the temperature of the sample has been raised above the aniline point a reading of the thermometer be made while it is being cooled at a controlled rate. Here again the operator must make a thermometer reading while the level of the indicating column is constantly changing. Recognizing the error which could be introduced in reading the instantaneous position of the level of a moving mercury column, the A. S. T. M. requires the operators to make several readings while repeating the tests and average the results in order to determine the aniline point with the required degree of accuracy.

It is evident that the method adopted by the A. S. T. M. for the determination of aniline cloud point is tedious, time-consuming and one which requires constant vigil by the operator.

Although the above method has proven itself to be practical over a given color range, it is believed to be inaccurate and inapplicable to dark samples.

The present invention obviates all of the difficulties surrounding the above method by providing a practical, accurate and rapid method of determining the aniline cloud point of petroleum products and lubricants over a wide color range that requires an absolute minimum of attention of an operator. The novel apparatus by means of which the method of the present invention is carried out is entirely automatic and can be operated by anyone who can read a thermometer since the level of the mercury column is substantially stationary at the critical solution temperature and is automatically maintained stationary as long as desired by the operator.

It is well known in the art that when equal volumes of aniline and petroleum product are mixed and agitated the mixture will be immiscible and cloudy or turburent below a critical temperature and miscible and clear at and above that temperature. This temperature line is extremely sharp and is referred to as the aniline point of that particular petroleum product.

The present invention takes advantage of the clouding and clearing of the mixture below and above, respectively, the critical temperature or aniline point to automatically control the internal heating and/or cooling of the mixture while it is being stirred to bring it to the critical temperature and maintain it at that temperature. This is accomplished by projecting light from a source onto the mixture and detecting light that is transmitted by the sample with a photoelectric cell and using the current produced by the photoelectric cell to operate a relay system. The relay system controls the heating, cooling or heating and cooling of the sample and is operated periodically as the sample clears or clouds with slight changes in temperature. These slight changes in temperature although great enough to produce clearing or clouding of the sample are less than 0.1° C. and are detected only by specially recommended laboratory thermometers. Therefore the present invention makes it possible to replace the three thermometers recommended by the A. S. T. M. by a single standard thermometer. The relay system also controls a signal system which will notify the operator when the equilibrium temperature has been reached.

Therefore the principle object of this invention resides in the provision of a novel apparatus for automatically determining the aniline point of petroleum products to a degree of accuracy not heretofore easily achievable.

Another object of this invention resides in the provision of automatic means for raising or lowering the temperature of a mixture of aniline and petroleum product to a critical temperature and maintaining it at that temperature with a high degree of accuracy.

Still another object of this invention resides in the provision of automatic signal means for signaling when the critical temperature or aniline point has been reached.

Another object of this invention resides in the provision of apparatus for the determination of the aniline point of petroleum products over a wide range of colors.

This invention further contemplates a novel sample container for holding the sample while it is undergoing test.

A further object of this invention resides in the provision of novel means for internally heating or cooling the sample.

Other objects and advantages of the present invention will become apparent from the following detailed description when considered with the drawings in which Figure 1 is a vertical sectional view of the sample holder also showing schematically the wiring diagram of the electrical apparatus associated therewith;

Figure 2 is a cross-sectional view of the sample holder taken along the line 2—2 of Figure 1;

Figure 3 is a vertical sectional view of the side arm of the sample holder taken along line 3—3 of Figure 1; and Figure 4 is a perspective view of the U-cooling tube and heater assembly.

Figure 1:
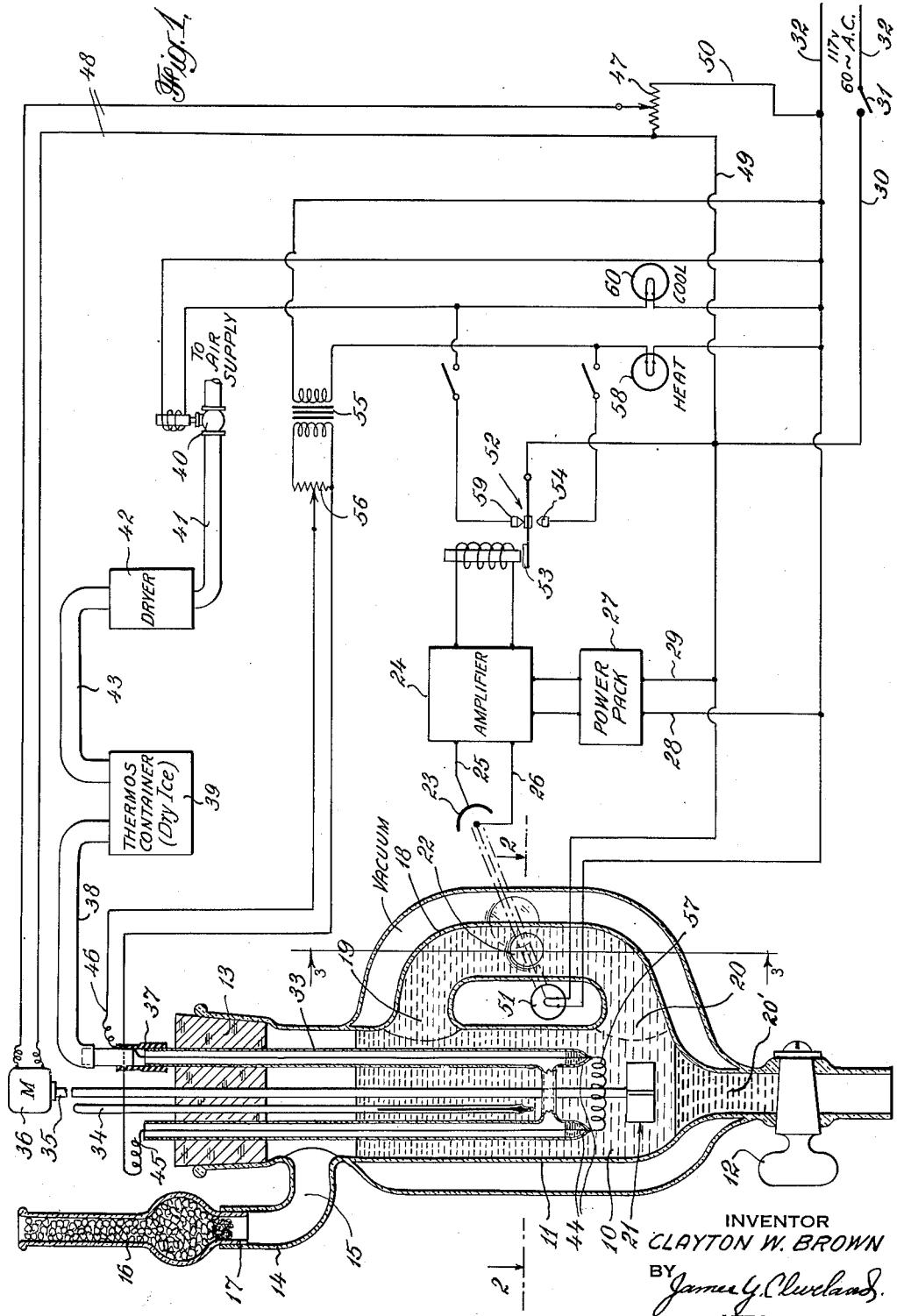

Referring to the drawings in detail, particularly Figure 1, there is shown a novel holder for a sample whose aniline cloud point it is desired to determine. The holder comprises an inner chamber 10 defined by a glass wall 11. The bottom of chamber 10 is provided with a drain cock 12 and the top with a stopper 13 which may be formed of cork, or other suitable material. Near the top of chamber 10 there is formed by the tube 14 an inlet passageway 15 which communicates with the interior of chamber 10. The tube 14 is preferably formed of glass and made integral with the wall 11. Removably disposed within the outer opening of passageway 15 and supported by the tube 14 is a drying tube 16 in which is disposed a suitable material which will absorb moisture from any air that may enter the chamber 10 through the passageway 15. In order that the drying material will not pass through the bottom opening 17 of drying tube 16 and enter the passageway 15, the bottom portion of drying tube 16 is filled with a packing such as cotton. The packing will permit air to pass into the passageway 15 and yet retain the drying material in the drying tube 16.

On the opposite side of chamber 10 from the passageway 15 the wall 11 is provided with a circulating arm 18. Arm 18 is made of glass tubing, preferably formed of optical glass, which has been bent into a substantially U-shape and the ends fused to openings 19 and 20 in the wall 11. Tube 18 forms a circulatory passageway for the sample whose aniline point it is desired to determine. During the process of conducting a test the liquid sample in the chamber 10 is stirred continuously by a stirrer 21, the impeller blades of which cause the liquid sample to circulate through the side arm formed by the tube 18. The junctions between the ends of tube 18 and the openings 19 and 20 are internally streamlined to facilitate free circulation of the sample, by the impeller of the stirrer 21. Further streamlining is effected by filling the tapering space in chamber 10 immediately above the stop-cock 12 with mercury 20'.

Tube 18 has a bulls-eye 22 formed in it at a point substantially midway of its length. This bulls-eye is formed by heating the optical glass in this area and pressing inwardly on opposite sides of the tube against a plane spacer with instruments having flat ends. After the glass has cooled and the tools and spacer removed inspection will show that a bulls-eye has been formed in the arm 18 having parallel plane lens and the desired spacing. This spacing may vary over a considerable range depending upon electric eye equipment used but it has been found that approximately 0.005'' is satisfactory for most setups. The entire section of the tube is not closed to this spacing in forming the bulls-eye but only an area large enough to form plane surfaces on opposite sides of the tube through which light may be projected without being appreciably dispersed. The passageway within the tube in that cross-sectional area around the bulls-eye is, in comparison to the area between the plane surfaces of the bulls-eye, relatively large. However, circulating the liquid sample through the tube 18 around the bulls-eye will cause the liquid sample to be continually swept in and out of the area between the plane surfaces of the bulls-eye.

The inner container 11 and its side arm 18 are enclosed in a glass jacket 23' which is sealed to the container 11 at the bottom near the stop-cock 12 and at the top above the height of the liquid sample level line. Jacket 23' forms with wall 11 a space around the wall 11 which is evacuated to render it non-heat-conducting. The evacuated space about the wall 11 also serves to prevent condensation of moisture, or frost formation, on the outside of the side arm 18 which would intercept the light impinging on bulls-eye 22.

Mixtures of petroleum product and aniline in accordance with A. S. T. M. specifications when agitated are cloudy below a certain critical temperature and clear above that temperature. Therefore, in order to determine the aniline point it is necessary to measure the temperature at which the sample under test changes from cloudy to clear or vice versa. To this end there is provided a photoelectric cell 23 which is connected to an amplifier 24 by means of conductors 25 and 26. Amplifier 24 is supplied with electrical power for its operation by means of a power pack 27 which is connected by conductors 28, 29 and 30 and switch 31 to power supply mains 32, which in turn are supplied with conventional 110–117 volt, 60 cycle alternating current power from a source not shown. The function of the output signal from the amplifier 24 will be discussed fully later in the specification.

The aniline point of petroleum products may be temperatures above room temperature, below room temperature or at substantially room temperature. Therefore, an instrument in order to measure the aniline points of all petroleum products must be sufficiently flexible that it can be operated under any of these conditions. To this end there is provided both heating and cooling means disposed within the chamber 10 for internally heating, cooling, or intermittently heating and cooling the sample undergoing test. Additionally, there is disposed in chamber 10 a thermometer by means of which the temperature representing the aniline point of the sample undergoing test can be determined.

The cooling means whereby the sample undergoing test can be internally cooled comprises a U-shaped tube 33 the arms of which extend outwardly from the chamber 10 through the cork or closure member 13. The thermometer 34 also extends through the cork 13 through a separate opening provided therefor. Additionally, the operating spindle 35 for the stirrer 21 extends outside of the chamber 10 through the cork 13 and is mechanically connected to an electric driving motor 36. One arm of the U-tube 33 is connected by suitable couplings 37 to a conduit 38 which leads to a thermos container 39. Container 39 may be filled with Dry Ice or other coolant through which air can be forced without becoming contaminated with moisture. Air is forced through the container 39 from a source not shown through a solenoid controlled valve 40 in the conduit 41 which connects to an air dryer 42. The outlet of the air dryer is connected directly to the thermos container 39 by means of the conduit 43. Air cooled by the Dry Ice or other coolant contained in the container 39 when circulated through the U-tube 33 is exhausted at the open end of the U-tube.

In order to heat the sample a heater element, formed of a material such as platinum, is secured to extensions 44 provided on the bottom end of the U-tube. The ends of the platinum wire project inside of the U-tube through passageways which have been sealed off to the wire in a known manner. The extensions 44 are filled with mercury to a point slightly lower than the level of the bottom of the cross passageway of the U-tube. The mercury is provided in order to make contact with copper lead wires 45 and 46 which are inserted into the arms of the U-tube from the top.

The electrical circuit can best be described in connection with a description of the procedure followed in determining the aniline point of a sample. Let us assume that the sample undergoing test has an aniline point which is approximately at room temperature. Under such conditions it will be necessary to both heat and cool the sample in order to accurately determine its aniline point. The proper mixture of aniline and petroleum product is placed in the chamber 10 through the passageway 15 after the drying tube 16 has been temporarily removed therefrom. After the sample is in the chamber drying tube 16 is again placed in operative position on the pipe 17. The stirring motor 36 which is supplied by means of conductors 48 with power by a voltage divider 47 which in turn is connected across the power supply mains 32, is started by closing the master switch 31. Closing switch 31 completes a circuit from the power supply mains 32 through conductors 30, 49 and 50, the switch 31 and the resistance element of the voltage divider 47. Throwing the switch 31 also lights the light 51 which is projected upon the bullseye 22 in the side arm 18 of the sample container. Additionally, the throwing of switch 31 energizes the power pack 27, which in turn applies the proper voltages to the amplifier 24 for its operation. The throwing of switch 31 also sets up additional circuits to be described later, which are controlled by the operation of the relay 52. When the sample has been placed in the chamber 10 and the stirrer 21 started, if the sample is cloudy it will intercept a portion of the light being transmitted through the bulls-eye 22 to the photoelectric cell 23 resulting in a current flow to the amplifier which will not operate the relay 52 to lift its armature 53 so that the contact carried by the relay will remain in engagement with the fixed contact 54. In this position of the armature 53 a circuit is completed through the primary of the transformer 55 which supplies power through a voltage divider 56 to the heating element 57. At the same time that the circuit is closed through the primary of transformer 55 the pilot light 58 is lighted since it is in an auxiliary circuit that is also energized by the relay 52 when its armature contact engages the fixed contact 54. Heat will continue to be supplied to the sample under test until the critical temperature is reached, at which time the sample will become clear and additional light will be transmitted through the bulls-eye 22 to the photoelectric cell 23. The change in current produced by the photoelectric cell 23 is amplified by the amplifier 24 and caused to energize the relay 52 to lift the armature and break the connection with the fixed contact 54 and make connection with the opposite fixed contact 59. The circuit established by engagement of the contact carried by the armature 53 and the fixed contact 59 is one through a solenoid controlled valve 40 in the air supply line. The energization of the solenoid circuit causes the valve to open in the conduit 41 and cool air is forced through the U-tube 33. At the same time that the solenoid valve circuit is energized a pilot light 60, connected in an auxiliary circuit that is also closed by the engagement of contacts 54 and 59, is lighted. Cold air will continue to circulate through the U-tube until the sample undergoing test has been cooled to the point where it again becomes cloudy, at which time the relay 52 operates to establish the heating circuit and the cycle is repeated over and over. This condition is signalled by the alternate flashing of lights 58 and 60 which are respectively connected in parallel with the heating and cooling control circuits. The alternate flashing of lights 58 and 60 signal the operator that the level of the indicator column in the thermometer 34 has become stationary and that the temperature indicated by the thermometer is the aniline point of the sample undergoing test.

When the temperature of the sample has been brought to the equilibrium temperature or aniline point, relay 52 is operated at regular intervals to alternately make and break the heating and/or cooling circuits. The frequency with which it operates is signalled by the lights 58 and 60. Although the time between alternate flashes of the lamps 58 and 60 has not been accurately measured, observation of the apparatus in operation indicates that the time interval between flashes is substantially less than 1 second.

I claim:

1. An apparatus for determining the aniline point of petroleum products and lubricants that comprises in combination a container for enclosing a liquid sample comprising the required proportions of aniline and the product to be tested, a stirrer, means for supporting the stirrer in the sample, means for operating the stirrer, heat exchange means disposed within the sample, means for supplying energy to the heat exchanger to internally heat the sample and means for supplying coolant to the heat exchanger for internally cooling the sample, means responsive to the miscibility of the sample for controlling the heating energy and the coolant supplied to the heat exchanger, and means for indicating the temperature of the sample.

2. An apparatus for determining the aniline point of petroleum products and lubricants that comprises in combination a container for enclosing a liquid sample having the required proportions of aniline and the product to be tested, a stirrer, means for supporting the stirrer in the sample, means for operating the stirrer, heat exchange means disposed within the sample, means for activating the heat exchanger to internally vary the temperature of the liquid sample to the aniline point and to maintain the temperature of the sample at substantially the aniline point, means responsive to the miscibility of the sample for controlling the activation of the heat exchanger, and means for indicating the temperature of the sample.

3. An apparatus for determining the aniline point of petroleum products and lubricants that comprises in combination a container for enclosing a liquid sample having the required proportions of aniline and the product to be tested, a stirrer, means for supporting the stirrer in the sample, means for operating the stirrer, heat exchange means disposed within the sample, means for supplying energy to the heat exchanger to internally heat the sample and means responsive to the miscibility of the sample for controlling the heating energy supplied to the heat exchanger, and means for indicating the temperature of the sample.

4. An apparatus for determining the aniline point of petroleum products and lubricants that comprises in combination a container for enclosing a liquid sample having the required proportions of aniline and the product to be tested, a stirrer, means for supporting the stirrer in the sample, means for operating the stirrer, heat exchange means disposed within the sample, means for supplying coolant to the heat exchanger for internally cooling the sample, and means responsive to the miscibility of the sample for controlling the coolant supplied to the heat exchanger, and means for indicating the temperature of the sample.

CLAYTON W. BROWN.

REFERENCES CITED

The following references are of record in the file of this patent:

UNITED STATES PATENTS

| Number | Name | Date |
| --- | --- | --- |
| 2,349,482 | Welty | May 23, 1944 |
| 2,380,082 | Sloan | July 10, 1945 |

FOREIGN PATENTS

| Number | Country | Date |
| --- | --- | --- |
| 419,238 | Great Britain | Nov. 8, 1934 |